United States Patent [19]
Vann

[11] 3,828,242
[45] Aug. 6, 1974

[54] ELECTROMAGNETIC INDUCTION EXPLORATION GUIDE ASSEMBLY

[76] Inventor: Robert M. Vann, 2906 S. Woodland, Amarillo, Tex. 79103

[22] Filed: July 18, 1972

[21] Appl. No.: 272,984

[52] U.S. Cl. ................................. 324/3, G01v/3/10
[51] Int. Cl. ............................................. G01v 3/08
[58] Field of Search ............ 324/3, 6, 67, 34 TK, 5, 324/7

[56] References Cited
UNITED STATES PATENTS

| | | | |
|---|---|---|---|
| 2,680,226 | 6/1954 | Whitehead et al. | 324/3 |
| 2,719,948 | 10/1955 | Zimmerman | 324/5 |
| 2,736,967 | 3/1956 | Doll | 324/6 UX |
| 2,744,232 | 5/1956 | Shawhan et al. | 324/3 |
| 2,987,668 | 6/1961 | Gondovin | 324/6 |
| 3,304,615 | 2/1967 | Ward et al. | 324/34 TK |
| 3,411,070 | 11/1968 | Anderson | 324/6 UX |
| 3,519,919 | 7/1970 | Rance | 324/3 |
| 3,549,985 | 12/1970 | Penland | 324/3 |
| 3,601,691 | 8/1971 | Gardiner | 324/3 |
| 3,634,753 | 1/1972 | Unterberger | 324/6 |

FOREIGN PATENTS OR APPLICATIONS 981,895  5/1951  France ........................... 324/34 T

OTHER PUBLICATIONS

Osborne, W. E. Transistorized Metal Locator, Electronics World, Mar. 1962, pp. 86–88.

Primary Examiner—Gerard R. Strecker
Attorney, Agent, or Firm—Ely Silverman

[57] ABSTRACT

An externally smooth and convex and axially symmetrical and resilient, abrasion resistant and electromagnetically transparent ground contacting coil guide assembly is firmly attached to the search or exploring coil of a metal and mineral detector to provide constant spacing and orientation of that coil relative to the mass of ground to be explored.

5 Claims, 12 Drawing Figures

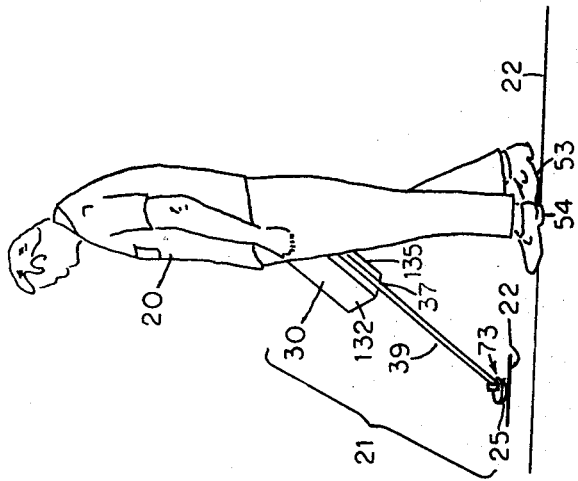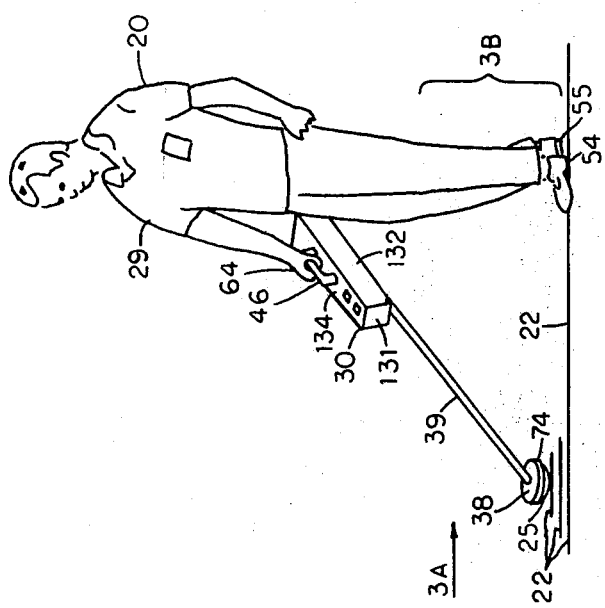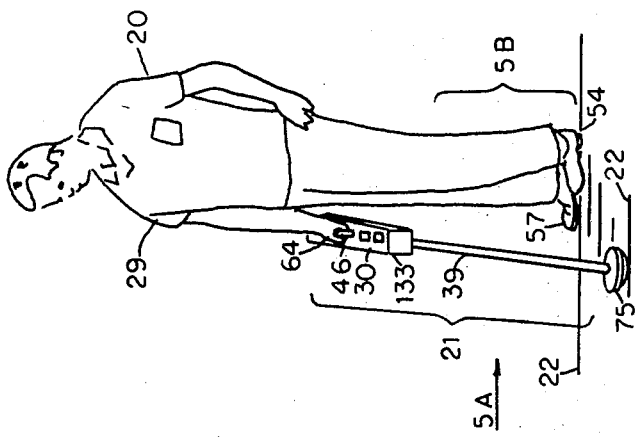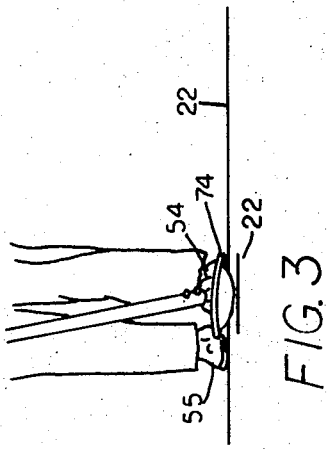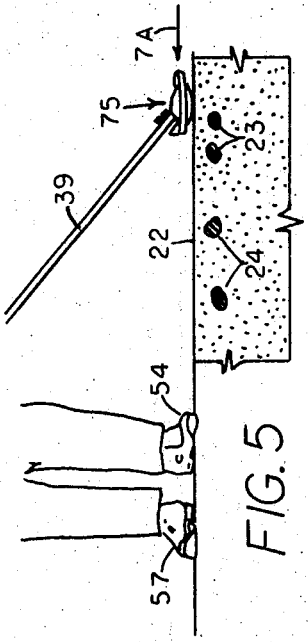

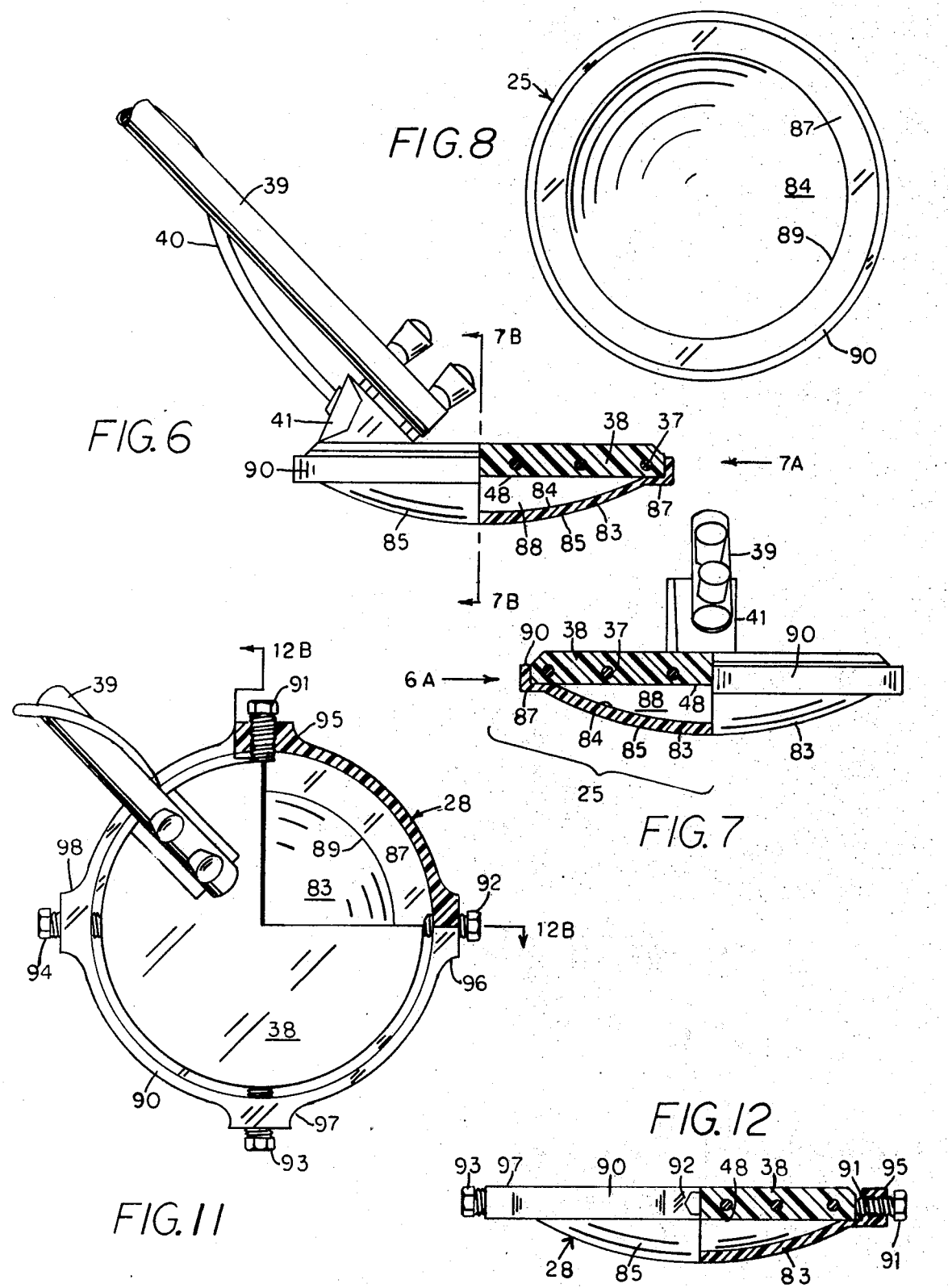

ELECTROMAGNETIC INDUCTION EXPLORATION GUIDE ASSEMBLY

BACKGROUND OF THE INVENTION

1. Field of the Invention

The field of invention to which this invention pertains is geophysical surface exploration using electromagnetic induction for buried conductor location.

2. Description of the Prior Art

Normally, the exploring loop of a metal detector is held by the operator a few inches above the surface of the ground to be prospected or explored and sensitivity is reduced to avoid spurious signals because if one raises the loop further away from the ground than it was adjusted for or lowers the loop closer to the ground than it was adjusted for, spurious signals are provided. A three to four inch up and down movement of the search coil during normal operation walking is recognized as usual. While the art is highly developed as to electronic circuitry, this operational problem has remained for a long time as a limitation to the use of such apparatuses.

SUMMARY OF THE INVENTION

An electromagnetically transparent guide assembly is attached to the support of the search coil of a electromagnetic induction metal and/or mineral detector. The guide assembly bears only a small fraction of the total weight of the detector, yet the amount of weight borne is adequate to maintain continuous contact of the guide assembly with the ground to be explored: The assembly is therefor sufficiently light to not interfere with the electromagnetic sensing radiations, yet is rigid enough to maintain sufficient dimensional stability, e.g., ±one-sixteenth inch, to eliminate any significant change in vertical spacing of the coil from the ground explored. The guide assembly has some resilient distortion and a smooth curved shape to permit smooth movement over rough terrain, e.g., gravel. The ground contacting surface of the guide assembly has a maximum spacing from the search coil, e.g., 3/4 inch, that is sufficiently close to the search coil to support the coil over the ground to be explored at a distance which is only a minor fraction of the depth of the magnetic field, e.g., 3 inches, to be explored by the search coil.

BRIEF DESCRIPTION OF THE DRAWINGS:

FIG. 1 shows the operator 20 moving forward while operating detector assembly 21 in one portion of a sequence of stages shown in FIG. 9.

FIG. 2 shows the operator 20 while operating detector assembly 21 in a stage of operation following that shown in FIG. 1.

FIG. 3 is a partial frontal view taken along the direction of arrow 3A of zone 3B of FIG. 2.

FIG. 4 shows the operator 20 while operating detector assembly 21 in stage following that shown in FIG. 2. FIG. 5 is a partial frontal view taken along the direction of arrow 5A of FIG. 4 in zone 5B of FIG. 4.

FIG. 6 is a composite side view and longitudinal vertical diametral sectional view taken along the direction of arrows 6A of FIG. 7 and section 6B—6B of FIG. 7.

FIG. 7 is a composite front view taken along direction of arrow 7A of FIGS. 5 and 6 and a transverse vertical sectional view taken through the section 7B—7B of FIG. 6.

FIG. 8 is a top view of the coil guide assembly 25 when separate from the coil frame 38.

Figure 9:
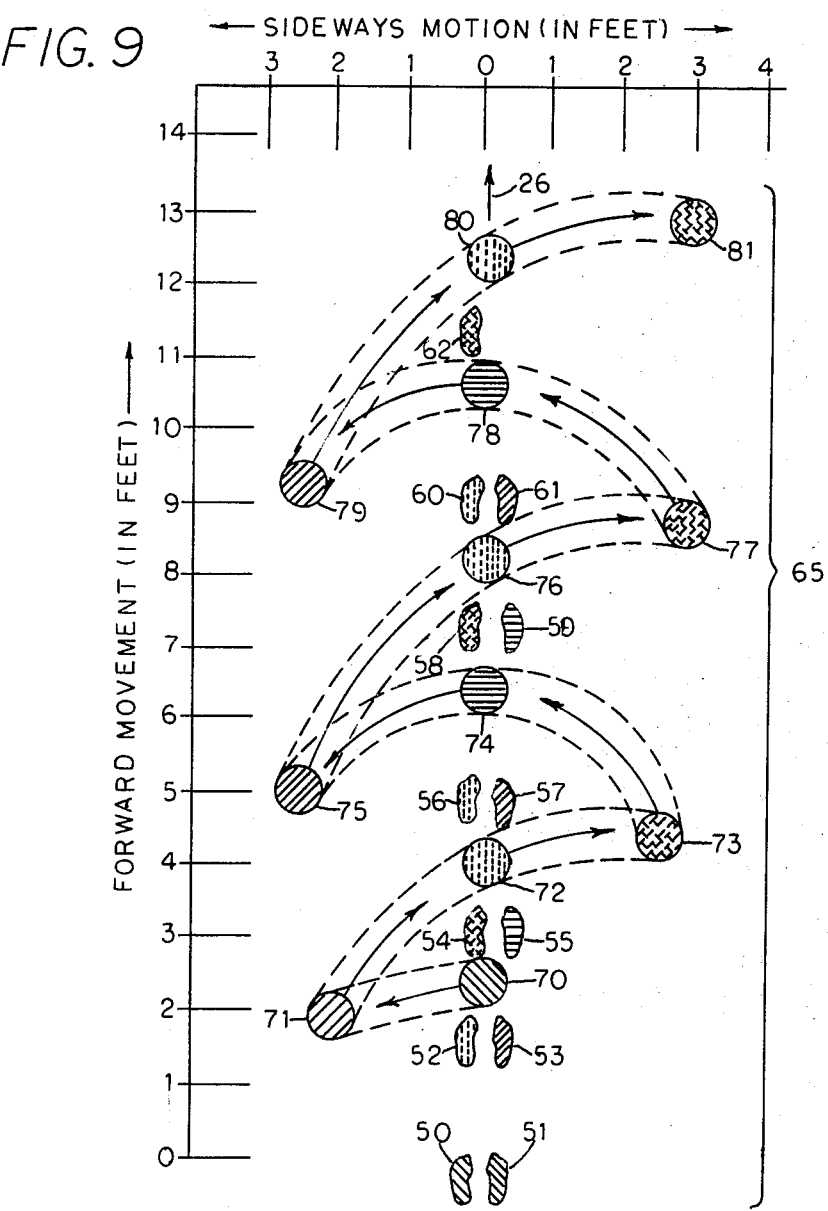
FIG. 9 shows, in plan view, a pattern 65 of the footsteps of operator 20 and concurrent positions of the sensor coil 37 during the operation of the detector assembly 21 as shown in FIGS. 1–5: Corresponding positions of feet and coil in FIG. 9 are hatched in the same type hatchings; these hatchings correspond to conventional coloring symbols as set out in Table II.

Other data relating to the operation illustrated in FIG. 9 are set out in Table I.

Figure 10:
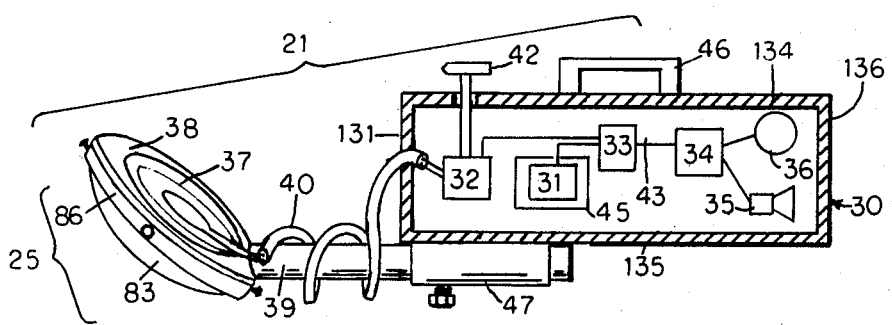

FIG. 10 is a block diagram of the circuit elements of the detector assembly 21.

FIG. 11 is a composite top and sectional view of another embodiment 28 of coil guide assembly shown on coil frame 38.

FIG. 12 is a composite side and sectional view of coil guide assembly 28 as seen along direction of arrow 12A of FIG. 11 and, in part, along section 12B—12B of FIG. 11.

DESCRIPTION OF THE PREFERRED EMBODIMENT

According to the process of this invention, an operator 20 moves a detector assembly 21 over the ground 22 as below described to detect metal particles as 23 or mineral particles 24 located in such ground.

In FIGS. 1, 2, 4 and 9, forward motion is indicated by arrow 26.

The detector assembly 21 comprises, in operative connection, a casing 30, oscillator units 31 and 32, an amplifier 34, a mixer 33, an audio output 35 and a meter output 36, a shaft 39, a sensor coil 37 and a coil guide assembly 25.

Casing 30 is formed of a front wall 131, left wall 132, right wall 133, top wall 134 and bottom wall 135 and rear wall 136 firmly and rigidly connected to form a rigid container structure and manipulation and location means for the shaft 39.

In general, the casing 30 supports therein a first or reference oscillator unit 31 and a second or search adjustable oscillator unit 32. The oscillator units each feed their output into a mixer 33 and the mixer output feeds an amplifier 34. The amplifier 34 feeds an audio output 35 and a meter output 36.

The second oscillator, or sensing or search oscillating unit 32, is operatively connected to a sensing or exploring coil 37. This coil is mechanically attached to and supported on a coil frame 38; frame 38 is firmly and rigidly attached to and supported on a rigid loop support shaft 39 by brace 41.

The rigid shaft 39 is firmly supported in a shaft clamp 47 which is firmly and rigidly attached to the bottom wall 135 of the casing 30. A shielded cable 40 connects the remaining components of the second, or sensing oscillator 32, to the coil 37.

Generally, the oscillators 31 and 32 are each supported within a rigid metal case 30. The output of each oscillator is fed to the mixer 33, which mixes the signals in the same manner as a mixer in a superheterodyne circuit. The mixer output 43 consists of both the sum and the difference of the two signals fed into it. Only the difference or beat frequency is used. The amplifier has a blocking capacitor that accepts only the lower, or beat frequency, into the amplifier 34. The amplifier, accordingly, feeds the beat frequency to the audio output 35 or the meter 36 or both.

The sensing or exploring coil 37 is an operative part of the resonant circuit of the second oscillator 32. When a metallic object enters the field of the sensing coil 37, eddy currents are induced therein which decrease the inductance of the coil and its field; accordingly, the frequency of oscillation of the sensing oscillator is increased. The first oscillator 31 is electromagnetically shielded in a shield 45 within the enclosure 30. When the second oscillator has changed frequency with respect to the first oscillator, the presence of metal is then evidenced as a change in the pitch heard or produced by the audio output 35. An adjustable capacitator 42 in unit 32 circuit provides a beat frequency at a desired rate. The beat frequency is increased or reduced as metal or mineral is approached by coil 37 and the output pitch will go up (or down), depending upon whether the reference oscillator has set or initial frequency below or above the first or sensing or search oscillator. Such circuits are common and known to those skilled in the art, such as, for instance, in *Popular Electronics*, September 1962, pages 38–42 and 108 and *How to Build Proximity Detectors & Metal Locators*, by John Potter Shields, H. W. Sams & CO., Inc., 1965 & 1972.

Detector instruments such as 21 may be provided with, for instance, 18 inch diameter loops, 12 inch diameter loops, 6 inch diameter loops and 3½ inch diameter loops. The large loops detect objects at greater depths, but the object must be larger to be detected. Materials the size of a one pound coffee can or larger would normally use the 18 inch loop.

For small objects, the small (6 inch and 3½ inch) loops are most suitable, as such small objects as small coins, rings, gold nuggets are not detectable with the larger loops. The 12 inch loop would be used for objects the size of a dollar and up (or larger). In general, the smaller the loop, the smaller the object that may be detected but the shorter is the detectable range of the loop. Additionally, in highly mineralized areas, one usually cannot use conventional detector instruments in the automatic positions to detect minerals and/or metals due to the fact that the operator is not able to carry such instruments steady enough to maintain constant and accurate readings without reducing the sensitivity of such instruments and reducing their detectable range except as herein provided.

The 6 inch loop of apparatus 21 is arranged to react to a single gold dollar (which is approximately one-half the size of the United States dime) and being larger, this loop will react to a single coin a little deeper than the 3½ inch loop.

The coil guide assembly 25 is firmly, yet releasably, attached to the coil frame 38. The coil guide assembly 25 comprises a dome-like shell 83, ring 87 and rim 90 as one integral piece. Shell 83 is a thin wall, generally curved in the shape of a symmetrical round spherical segment or dome and is transparent to the electromagentic frequencies produced by the search coil 37 and oscillator 32.

In the particular embodiment 21, the material forming assembly is a thermoplastic acrylic-polyvinyl chloride alloy known as KYDEX 5000 (KYDEX is a registered trademark of Rohm and Haas, Philadelphia, Pennsylvania, and described in KYDEX Design & Fabrication Data, PL-674c). It has properties as set out in TABLE IV.

Flat ring 87 is an annular plate continuous with and firmly joined at its inner edge 89 to the outer circular edge of the shell 83. The outer edge of the flat base ring 87 is firmly attached to a right cylindrical thin-walled rim 90.

The interior surface 84 of the shell 83 is continuous with the upper surface of the base 87 and the exterior surface 85 of the shell 83 is continuous with the exterior surface of the base 87. The bottom surface 48 of the coil frame 38 is in direct contact with the upper interior surface of the base 87 and in the particular embodiment shown in FIGS. 6, 7 and 8, a press fit is formed between the outer edge of coil frame 38 and the inner edge 92 of the rim 90 and said rim is firmly attached to said coil support means and holds the ground contacting surface in fixed spatial relationship to the coil. An air space 88, which is, in the undeflected position of the shell 83, a segment of a solid sphere, is bounded by the top surface 84 of shell 83 and the bottom surface 48 of the coil frame 38 the coil guide assembly thus comprises the continuous curved ground contacting electromagnetically transparent shell or wall 83 spaced away from the search coil by a distance transverse to the coil plane and convexly curved relative to the coil; such shell has the annular ring or plate as 87 as a support means therefor; the curved wall 83 and its surface portions being firmly yet resiliently attached to base or ring 87.

In operation, the operator 20 holds the apparatus 21 by the handle 46. The pacing pattern 65 in the use of this apparatus according to this invention is diagramatically shown in FIGS. 1–5 and 9 and tabulated in Table I herebelow.

At the starting position, the operator holds handle 46 of assembly 21 in one hand (64) and rests the bottom edge of the shell 83 on the upper surface of the ground 22 to be explored: A balancing effect is applied to assembly 21 by the operator 20 through the handle 46 and provides that the shell 83 provides a downward force of from ½ to 2 ounces on the ground. The shell 83 shows a vertical deflection upward of less than one-sixteenth inch until the downward force applied by shell 83 on the ground 22 exceeds one pound (as measured in a postal scale sensitive to ±less than ½ ounce). On a downward force of 1 pound on the ground by shell 83, shell 83 suffers a flattening deflection of between one-sixteenth and one-eighth inch. At ¼ pound force, there is no usually observable flattening or deflection by the naked eye of the surface of shell 83.

At the operator's starting position, the operator stands with his left foot at position 50 of FIG. 9 and the operator's right foot in position 51, and the coil 37, frame 38 and coil guide 25 in the position shown as 70.

The operator then steps forward with his right foot while his weight is on his left foot (at 50) and swings his right foot to the position shown as 53. On this forward foot (and vertical shoulder) movement, the assembly 21 is moved counterclockwise to the left and the loop 37 is then moved towards position 71 of FIG. 9 and assembly 21 is then generally located in the position across the body of the operator as shown in FIG. 4. By the use of the guide element 25, the bottom contact point 86 of the bottom surface 84 of the element 25 which is located within the field of the search coil is continuously in contact with the ground 22 and only a small weight, more than onehalf ounce and less than two ounces, is borne by the shell 83. The upward deflection of the wall of the shell 83 is less than one-sixteenth inch at this point and the coil 37 held at a substantially constant height over the ground, although the height of handle 46 held by operator's hand may vary 1 to 4 inches, as below described.

From this position of the assembly 21 and the feet of the operator, the operator shifts his weight to right foot at position 53 and swings left foot forward from position 50 to position 52 and toward position 54, while lowering his right shoulder at the position whereat the left foot is passing through position 52 and the right foot is abreast of the left foot and, as shown in FIG. 9: The coil 37 is then in position 72.

Following such momentary array, the left foot of the operator moves to position shown as 54 in FIG. 9 while the right foot is still in position 53, i.e. trailing to the rear, while operator's right shoulder begins to rise and assembly 21 swings to the operator's right with loop 37 reaching the position shown as 73 in FIG. 9. At this position, the bottom surface 85 of shell 83 still has a lowest point 86 in contact with the ground 22 and between one and two ounces downward pressure is then applied by the shell 83 to the ground and the upward deflection of the shell 83 again is less than one-sixteenth inch. The position of the operator's feet and of the frame 38 and shaft 39 and coil guide 25 are then as shown in FIG. 1.

Following this position of shoulders, feet and apparatus, the operator 20 swings his right foot forward from the position shown as 53 to the position shown as 55 while his weight remains on his left foot (at 54) and his right shoulder 29 raises one-half to 2½ inches, and frame 38, coil 37 and shaft 39 of the apparatus 21 are moved leftward or counterclockwise to the position shown as 74 in FIGS. 2, 3 and 9, whereat again the coil guide assembly 25 has the bottommost contact point 86 of the shell 83 in continuous contact wtih the ground and bearing a substantially uniform and continuous weight of between one-half and 2 ounces and suffering a vertical deflection of less than one-sixteenth inch, although shoulder 29 of the operator rises. The assembly 25 thus maintains the coil 37 in a substantially constant (± one-sixteenth inch) spatial relationship to the ground 22.

Immediately following this instantaneous position, the operator 20 continues the movement of his right foot forward to the position thereof, shown as 57 of FIG. 9, while the coil frame 38 and the coil 37 thereof and the coil guide assembly 25 are moved leftward to the position shown as 75 in FIGS. 4, 5 and 9. At this point, the position of the operator's feet are shown as 54 and 57 in FIGS. 4 and 5. In such movement and position also, notwithstanding the movement of operator's shoulders, the bottom surface of the shell 83 is, at the contact point 86, in continuous contact with the ground 22 and bears a substantially uniform and continuous weight of between one-half and 2 ounces and suffers an upward deflection of about one thirty-second inch and less than one-sixteenth inch. The assembly 25 thus maintains the coil 37 in a substantially constant (± one-sixteenth inch) spatial relationship to the ground 22 during this phase of operation.

Following this position of the operator's feet, hands and the apparatus 21, the operator moves the coil 37, the coil frame 38 and the coil guide assembly 25 rightward to position 76, while the left foot moves from position 54 to 56 while the weight of the operator 20 is borne on his right foot (at 57) and coil 37, the frame 38 and the coil guide assembly 25 are moved to the central position shown as 76 in FIG. 9. Here again, although the operator's right shoulder is lowered, the bottom surface of the shell 83 maintains continuous contact with the ground 22 and the same slight amount of contact force, i.e., between one-half and 2 ounces, is borne by the bottom shell surface 85 and the vertical deflection of the shell 83 is minute - - - about 1/32 inch and less than one-sixteenth inch. Continuance of this clockwise or right hand movement of the coil frame 38, coil 37 and coil guide assembly 25 continues to the right to the position shown as 77 in FIG. 9, but which is quite the same as shown for position 73 in FIG. 9 and also shown in FIG. 1. Here again, the bottom surface 85 of the shell 83 is in continuous contact with the ground 22 with the resulting vertical deflection of the shell 83 less than one-sixteenth inch and the shell then bearing a weight of between one-half ounce and 2 ounces.

Following this position of operator's feet, coil 37 and operator's shoulder supporting the instrument, the coil frame 38 with the coil 37 and the coil guide assembly 25 is moved counterclockwise or leftward, as shown in FIGS. 9 and 2, while the operator's right foot swings from the position 57 to the position shown as 59, while the coil 37, the coil frame 38 and the coil guide assembly 25 are moved clockwise to the central position shown as figure 78 in FIG. 9. Although the operator's shoulder supporting instrument 21 rises, the bottom surface 85 of the shell 83 is continuously in contact with the ground 22 and bears a substantially minute weight of between one-half and 2 ounces and the assembly 25 thus maintains the coil 37 in a substantially constant (± one-sixteenth inch) spatial relationship to the ground 22. At this point, in the operation of the apparatus 21 by the operator 20, the positions of the operator's feet and right shoulder are the same as shown in FIGS. 2 and 3 and also as described for foot positions 54 and 55 and position 74 of the coil 37, coil frame 38 and coil guide assembly 25.

Following this position of the operator's feet, the operator bears his weight on his left foot (at 58) while his right foot moves from position 59 to 61 of FIG. 9, his right shoulder falls slightly and the coil frame 38, coil 37 and coil guide assembly 25 move without change in height relative to the ground 22 to the position 79 of FIG. 9 (corresponding respectively to positions 75, 57 and 54 and shown in FIGS. 4 and 5). Following this position of parts of the apparatus 21, the operator 20 again swings the coil frame 38, coil 37 and coil guide assembly 25 clockwise and to the right and at constant height relative to ground 22, as shown in FIG. 9, to the position of coil frame 38, coil 37 and coil guide assembly 25 indicated as 80 in FIG. 9. Here again, the bottom of the coil guide assembly 25 is in contact with the ground 22 and bears the coil 37 at the same height over the ground 22 as above described for the position of such apparatus units 25, 37 and 38 in positions 71 to 77, notwithstanding the usual vertical movement of the operator's shoulder supporting the instrument 21. Following this momentary position, the coil 37, coil frame 38 and coil guide assembly 25 are moved to position 81 which corresponds to positions 77 and 73 below described. Accordingly, the position of coil or loop 37 is a repetition of the movement of feet, coil and shoulder from position 71 to 72 to 73 to 74 to 75 in the cycle of steps respectively provided for the movement of such coil from positions 75 to 76 to 77 to 78 to 79 as shown in FIG. 9.

During normal adult human walking, as the operator 20 puts his weight on his left foot, as at positions 54 and 58 of FIG. 9, and swings his right foot forward, as at positions 55 and 59 of FIG. 9, the right hip and shoulder as well as foot are raised and the operator's hand 64, unless its arm is theretofore bent at its elbow, will rise. Also, as the operator puts his weight on his right foot and swings his left foot forward as at positions 56 and 60 of FIG. 9, the left hip and shoulder as well as left knee rise and the right shoulder falls; accordingly, during forward motion, as set out in Table I, the operator's shoulder usually rises and falls, however, as above described, such usual height variation at the support for a detector device as 21 without the guide assembly 25 is avoided by the apparatus 21 inclusive of the guide assembly 25 as herein provided.

The unit 25 thus provides smooth and convex shell surfaces 84 and 85. These surfaces are axially symmetrical, that is symmetrical about the center of the circular coil frame 38. The material of which this shell 83 is made is electromagnetically transparent, and accordingly provides no interference with the electromagnetic waves produced by the oscillator unit 31 and coil 37. Dimensions of coil guide assemblies as 25 are set out in Table III.

As above described, this coil guide assembly 25 provides for a constant orientation and vertical spacing of the coil 37 relative to the mass of earth 22 being explored by the coil 37. Also as the upward force of ground 22 on the apparatus 21 used by the operator 20 is provided below the center of gravity of the apparatus 21, such force provides a torque when the force is not centered that is readily sensed by the hand of operator to provide orientation control of the coil 37 (as well as spacing) within ±5°. The usual balanced support of the coil as 37 at its handle as 46 holding the coil out of contact with the ground 22 provides no such accuracy of vertical location of the coil without assembly 25. The particular apparatus 21 used herein is a Nuggetmaster made by White's Electronics, 1101 Pleasant Valley Road, in Sweethome, Oregon, model no. NM60, serial no. 900-546, although any other similar apparatus could have the element 25 attached thereto as herein described. The shaft 39 is rigid, i.e. seven-eighths inch outside diameter aluminum tubing and one-sixteenth inch thick wall. The assembly casing 30 is made of 0.05 inch steel and is rigid enough to be free from mechanical vibrations to avoid frequency instability. The casing 30 and handle 46 and shaft 39 and coil support 38 are modified to form a single rigid assembly to which assembly 25, 28 or 21' is attached.

While the weight of the apparatus 21 is 9 pounds when held by its handle 46, the force on the ground 22 is only about 1 ounce (±one-half ounce) and certainly less than 2 ounces; accordingly, such light force is readily withstood by the extremely light yet sturdy guide assembly 25, while there is still an unnoticeable vertical deflection of such assembly; the loop 37 is thereby readily and reliably held at a fixed distance from the ground 22.

The use of a small size loop as herein provided, provides for movement over irregular ground with a fixed orientation of the axis of the loop with respect to the vertical or with a plane tangent to the point of contact with the mass of earth being investigated with a minimum of eye judgment required by the operator.

These relations are particularly important in exploring stream beds where the operator's view of the bed is disturbed or blocked by water and the force of the flowing stream against the surface of the coil frame 38 makes maintenance of a fixed spacing between the exploring loop as 37 and the upper surface of the mass of earth explored particularly difficult and substantially impractical except with the use of a guide element as 25 affixed to the frame 38.

According to this invention, the angle of the bottom surface 85 to the surface of the earth being explored is usually less than 5° and freqeuntly less than 1° inasmuch as the radius of curvature of the bottom surface is 4 to 6 inches. This angle is sufficiently small to avoid any mechanical shock, while the material of the shell 83 is sufficiently thick and sufficiently rigid to avoid severe deflection and holding of the shell by the earth.

While a one-fourth inch change in height varies readings obtained in higly mineralized areas as near Hillsboro in New Mexico and Lake Linden in upper peninsula area of Michigan, the apparatus of this invention operates satisfactorily in such areas to locate small nuggets and the like.

In embodiment 21, the press fit of the rim 90 on the exterior of the loop frame 38 holds the coil guide assembly 25 in place adequately firmly for all usual movement of the coil 37 in ordinary use thereof but, being releasable, provides an overload release when extraordinary forces are applied thereto and, being readily replaced prevents damage to the coil frame.

In yet another embodiment of this apparatus, threaded adjustment bolts 91, 92, 93 and 94 are provided. These bolts are attached to threaded boss portions 95, 96, 97, 98 respectively, in the rim 90 whereby to attach the rim to the outer surface of frame 38, where the apparatus 28 does not have a press fit on such frame. Apparatus 28 is shown in FIGS. 11 and 12.

Accordingly, the embodiment 28 of coil guide assembly has the same components, rim 90, shell 83 and base 87, as does assembly 25 and functions in the same manner as does assembly 25 except that the rim is thickened and strengthened by the bosses 95, 96, 97 and 98 and the adjustment of screws 91, 92, 93, 94 is used (in place of the press fit) to hold the coil guide assembly in place on the coil frame 38. The screws 94, 91, 92 and 93 are formed of the same plastic material as the assembly 25 and do not interfere with the magnetic field of coils as 37 attached to the oscillator unit 32 in the operation of the unit 21.

During the most sensitive setting of such an instrument as the Nuggetmaster, model NM60 above referred to, which costs about $300.00, at a setting such that the beat frequency is 4 beats per second, holding a cylindrical pack of four U.S. nickels at a distance of 3 inches from the center of the bottom 48 of the loop frame 38 provides a discernable signal but at a distance in excess of 3 and ½ inches from such loop frame bottom, the metallic mass is not detected. At higher beat frequencies, e.g. at about 128 vibrations per second, the sensitivity is less. The sensitivity of the instrument is not affected by the attachment thereto of the coil guide assembly 25.

The Nuggetmaster, model NM-60 above described has an energizing frequency to coil 37 of 100,000 cycles per second (or 100 Kilohertz) or 85-110 KHz range, although other machines operating at such frequencies, by transistor as well as tube circuits, or other frequencies usable for metal and mineral detection may be used in place of the particular electrical components herein above referred to. The coil 37 comprises a 1 inch diameter coil, a 4 inch diameter coil and a 6 inch diameter coil connected in parallel, although guide assembly 25 may be used with coils of other configurations.

Dimensions of another size guide assembly 21' corresponding to 25 in structure and function are set out in Table III.

Other dimensions of the apparatus 21 are set out in Table V.

TABLE I

POSITION OF OPERATOR'S FEET, RIGHT SHOULDER AND COIL DURING OPERATION OF ASSEMBLY 21

| Feet | | Coil | Right Shoulder | |
|---|---|---|---|---|
| Left | Right | Position | Height | Movement |
| 50 | 51 | 70 | Normal | |
| 50 | 53 | 71 | Normal | Begins to Fall |
| 52 | 53 | 72 | Low | Begins to Rise |
| 54 | 53 | 73 | Normal | Continues to Rise |
| 54 | 55 | 74 | High | Begins to Fall |
| 54 | 57 | 75 | Normal | Continues to Fall |
| 56 | 57 | 76 | Low | Begins to Rise |
| 58 | 57 | 77 | Normal | Continues to Rise |
| 58 | 59 | 78 | High | Begins to Fall |
| 58 | 61 | 79 | Normal | Continues to Fall |
| 60 | 61 | 80 | Low | Begins to Rise |
| 62 | 61 | 81 | Normal | |

TABLE II

CORRESPONDING FOOT AND COIL POSITIONS AND COLORS THEREOF INDICATED BY HATCHINGS ON FIG. 9

| Position | | Color |
|---|---|---|
| Foot | Coil | |
| 50, 51 | 70 | Green |
| 53 | 71 | Brown |
| 52 | 72 | Purple |
| 54 | 73 | Orange |
| 55 | 74 | Blue |
| 57 | 75 | Brown |
| 56 | 76 | Purple |
| 58 | 77 | Orange |
| 59 | 78 | Blue |
| 61 | 79 | Brown |
| 60 | 80 | Purple |
| 62 | 81 | Orange |

TABLE III

COIL GUIDE ASSEMBLY DIMENSIONS

| COMPONENT | Embodiment | 25 | 21' |
|---|---|---|---|
| RIM 90 | Outside diameter (inches) | 6.3 | 8.0 |
| | Thickness (inches) | 0.023 | 0.025 |
| RING 87 | Inside diameter (inches) | 4.75 | 6.75 |
| | Thickness (inches) | 0.032 | 0.028 |
| | Radius of curvature at junction 83 and 87 (inches) | ⅛ | ¾ |
| SHELL 83 | Radius of curvature (inches) | 4.0 | 6.0 |
| | Thickness of wall at center (point 86 in FIG. 6) (inches) | 0.037 | 0.032 |
| | Depth of point 86 from top surface of ring 87 (inches) | 0.75 | 15/16 |
| WEIGHT | (in ounces) | 1.0 | 1.5 |

TABLE IV

AVERAGE PHYSICAL PROPERTIES OF KYDEX SHEET

| PROPERTY | TEST METHOD | KYDEX 5000 |
|---|---|---|
| Specific Gravity | ASTM D-792 | 1.35 |
| Weight (lbs./sq. ft.), ⅛" | — | 0.878 |
| MECHANICAL PROPERTIES | | |
| Tensile Strength (psi) | ASTM D-638 | 6,300 |
| Modulus of Elasticity (psi) | | 310,000 |
| Elongation at Break (%) | | >100 |
| Flexural Strength (psi) | ASTM D-790 | 9,700 |
| Modulus of Elasticity (psi) | | 330,000 |
| Compressive Strength (psi) | ASTM D-695 | 8,000 |
| Bearing Strength (psi) | ASTM D-953 | 5,500 |
| Shear Strength (psi) | ASTM D-732 | 4,500 |
| Flexural Fatigue Resistance (cycles) 2,000 psi outer fiber stress | R & H P078 | — |
| Hardness | ASTM D-785 | |
| Rockwell R | | 95 |
| Rockwell L | | 60 |
| Durometer Shore D | ASTM D-2240 | 70 |

TABLE V

APPARATUS 21 DIMENSIONS

| BOX 30 | Length | 17½" |
|---|---|---|
| | Width | 5½" |
| | Height | 4¼" |
| SHAFT 39 | Length (Total) | 33" |
| | Diameter | ¾" |
| CLAMP 47 | Length | 6" |
| FRAME 38 | Thickness | 1" |
| | Outside Diameter | 6¼" |
| | Angle of Top of Frame To Axis of Shaft 39 | 45° |
| HANDLE 46 | Length | 5" |
| | Diameter | 1" |
| | Vertical Arms 46A, 46B | ¾"×⅛" |

I claim:

1. In an assembly for detecting minerals and metals comprising a first reference electromagnetic oscillator, a second electromagnetic generating oscillator and a signaling output, said second generating oscillator including a search coil extending in a first coil plane and supported on a coil support means and having an electromagnetic field externally extending therefrom and wherein said oscillators and signaling output are firmly supported in a rigid casing, a rigid shaft extends from said casing to said coil support means, a handle is provided on said casing and firmly affixed thereto, said handle and casing and shaft and coil support means firmly and rigidly joined to form a rigid assembly and wherein said search coil is attached to and supported on said coil support means and a search coil guide assembly is attached to said coil support means, said coil guide assembly comprising a continuous curved ground contacting electromagnetically transparent mechanically resiliently deformable wall generally curved in shape of a symmetrical spherical segment with a peripheral lateral circular edge and with an exterior convex surface spaced away from the search coil by a distance transverse to said coil plane and convexly curved relative to the coil, and a support means for said ground contacting wall comprises a flat annular ring with an inner edge thereof firmly yet resiliently attached to the periphery of said curved ground contacting electromagnetically transparent mechanically resiliently deformable ground contacting wall and said support means whereby the exterior surface of said curved ground contacting wall is spaced away from said coil in a direction transverse to the said coil plane, said ground contacting exterior wall surface being located within the field of said coil, said coil having a magnetic field, said field having a depth, said ground contacting surface of said wall being spaced away from the search coil by a distance which is only a minor fraction of the depth of said magnetic field.

2. Apparatus as in claim 1 wherein said coil guide assembly comprises a thin circular convex wall with a circular peripheral edge firmly attached to said annular ring, said annular ring extending laterally to a cylindrical rim and firmly attached to said rim and said rim is firmly attached to said coil support means and holds said ground contacting wall and its convex exterior surface in fixed spatial relationship to said coil, an air space between said coil and said ground, said groun contacting wall resiliently yielding between one-sixteenth and one-eighth inch on application of a force of one pound to the exterior surface of said wall in direction opposite to the convexity of said convex exterior surface of said wall in direction opposite to the convexity of said convex exterior surface.

3. Apparatus as in claim 2 wherein the cylindrical rim had adjustably located therein clamping means, which clamping means are adjustably located in said rim to locate said rim on said coil support means.

4. A electromagnetic induction exploration coil guide assembly for attachment to an electromagentic induction coil support means, said induction coil support means supporting an electromagnetic induction coil, said coil guide assembly comprising as an integral unit a continuous curved ground contacting electromagnetically transparent mechanically resiliently deformable wall generally curved in shape of a symmetrical spherical segment with a lateral peripheral circular edge and an exterior convex surface and a wall surface support means wbich is in the shape of an annular plate and is firmly yet resiliently attached to said curved ground contacting electromagnetically transparent mechanically resiliently deformable wall at the lateral periphery thereof and wherein said wall with convex exterior surface has its lateral circular, peripheral edge firmly attached to the interior edge of the annular plate, said plate extends laterally from the lateral edge of said convex wall to a cylindrical rim and firmly attaches to said rim, and said rim extends in direction opposite to the direction of the convexity of said convex wall surface, said ground contacting wall surface resiliently yielding in direction transverse to the exterior surface of said curved convex wall between one-sixteenth and one-eighth inch on application of a force of one pound to said exterior surface of said wall in direction opposite to the convexity of such convex wall surface.

5. Apparatus as in claim 4 wherein the cylindrical rim has adjustably located thereon clamping means, which clamping means are adjustable located on said rim and firmly locate said rim on said coil support means.

* * * * *